(12) United States Patent
Moore

(10) Patent No.: US 7,853,421 B2
(45) Date of Patent: Dec. 14, 2010

(54) SYSTEMATIC SURFACE REVIEW

(75) Inventor: Jeffrey L. Moore, Lakeside, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 442 days.

(21) Appl. No.: 11/839,576

(22) Filed: Aug. 16, 2007

(65) Prior Publication Data

US 2009/0049377 A1   Feb. 19, 2009

(51) Int. Cl.
*G01N 37/00* (2006.01)

(52) U.S. Cl. .......................................... 702/81

(58) Field of Classification Search ............... 702/81, 702/90, 94, 95, 119, 120, 150, 151–153, 702/155, 156, 158, 167, 183; 700/97, 182
See application file for complete search history.

(56) References Cited

U.S. PATENT DOCUMENTS

| | | | |
|---|---|---|---|
| 4,299,491 A | 11/1981 | Waters | |
| 5,521,847 A * | 5/1996 | Ostrowski et al. | 702/152 |
| 5,576,492 A | 11/1996 | Phalin | |
| 6,144,890 A * | 11/2000 | Rothkop | 700/97 |
| 6,151,567 A | 11/2000 | Ames | |
| 6,606,541 B2 | 8/2003 | Vaidyanathan | |
| 6,909,800 B2 | 6/2005 | Vaidyanathan | |
| 7,149,677 B2 | 12/2006 | Jayaram | |
| 7,225,396 B2 | 5/2007 | Chen | |
| 2005/0043916 A1* | 2/2005 | Wu et al. | 702/167 |
| 2005/0200858 A1 | 9/2005 | Johnson | |
| 2006/0193179 A1 | 8/2006 | England | |
| 2006/0221349 A1 | 10/2006 | Que | |
| 2007/0039390 A1 | 2/2007 | Duncan | |
| 2007/0050172 A1* | 3/2007 | Frost et al. | 702/156 |

\* cited by examiner

*Primary Examiner*—Mohamed Charioui
(74) *Attorney, Agent, or Firm*—Carlson, Gaskey & Olds

(57) ABSTRACT

A method and system of comparing a part to a computer model of the part obtains coordinate data for a plurality of points on a part, compares the coordinate data to a computer model of the part to obtain comparison data, reports the comparison data corresponding to a selected surface of the part, and excludes comparison data for all surfaces other than the selected surface.

19 Claims, 6 Drawing Sheets

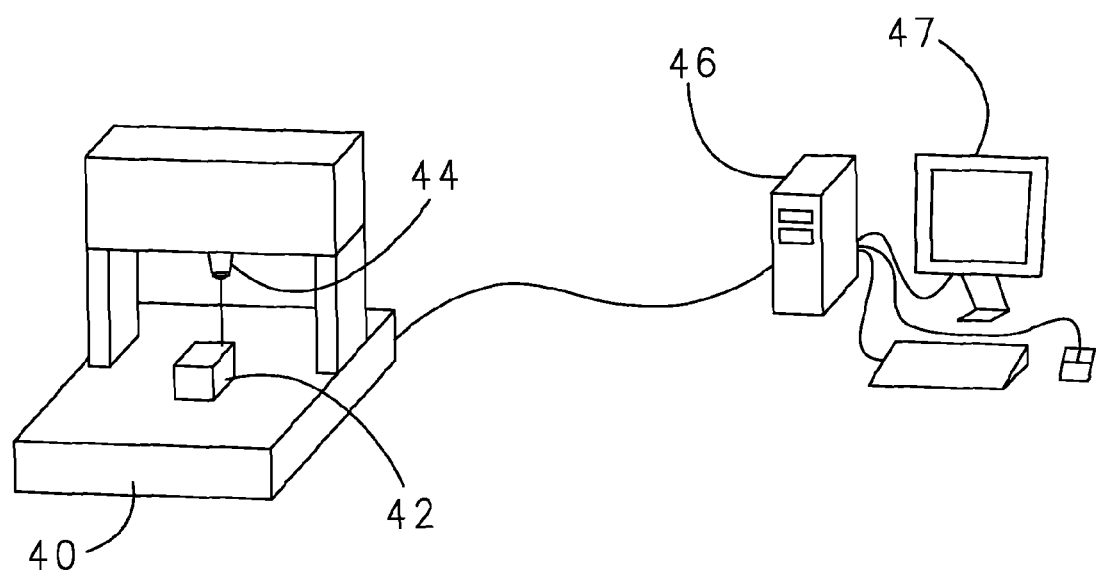
F I G. 1

SYSTEMATIC SURFACE REVIEW

BACKGROUND OF THE INVENTION

This invention relates to inspection of parts, and more particularly to comparing a physical part to a computer model of the part.

When designing, developing, or optimizing a product, such as a part for a vehicle, it is common to create a computer model of the part. In some cases, computer-aided design ("CAD") software tools are used to create a computer model. A computer model of a part typically has a plurality of surfaces. For example, a CAD model of a cube would have six planar surfaces. However, in more a complex CAD model, such as a casting for a turbine engine, there will be many more surfaces, and it is likely that not all surfaces will be planar. In one example, a designer operating CAD software and the CAD software itself determine what constitutes a surface within a computer model. A typical CAD model may comprise hundreds or even thousands of individual surfaces.

Once a part is actually created, it is desirable to compare the part to an associated computer model of the part to verify that the part has been created accurately as part of an end of line quality control process. In the past this was achieved through mechanical inspection via a surface plate using a height gage, rotary tables, and handheld inspection tools. However, an example part may have hundreds or thousands of surfaces, and mechanical inspection is slow and does not provide sufficient data to obtain accurate measurements.

More recently, scanners have been used to scan a part with a laser to obtain detailed coordinate data for a plurality of points on the part. Some scanners are able to obtain coordinate data for up to 400,000 points per second. Software may be used to compare the coordinate data to an associated computer model of the part. Comparison data may then be reported in a visual display. Existing software reports comparison data for an entire area of a part. This is undesirable because an area of a part may have hundreds of different surfaces that are being reported simultaneously. When comparison data for so many surfaces is displayed simultaneously, isolating and diagnosing problematic surfaces becomes very difficult. There is a need for an improved system for part inspection.

SUMMARY OF THE INVENTION

A method and system of comparing a part to a computer model of the part obtains coordinate data for a plurality of points on a part, compares the coordinate data to a computer model of the part to obtain comparison data, reports the comparison data corresponding to a selected surface of the part, and excludes comparison data for all surfaces other than the selected surface.

These and other features of the present invention can be best understood from the following specification and drawings, the following of which is a brief description.

BRIEF DESCRIPTION OF THE DRAWINGS

FIG. 1 schematically illustrates an example scanning system.

DETAILED DESCRIPTION OF THE PREFERRED EMBODIMENT

Figure 2:
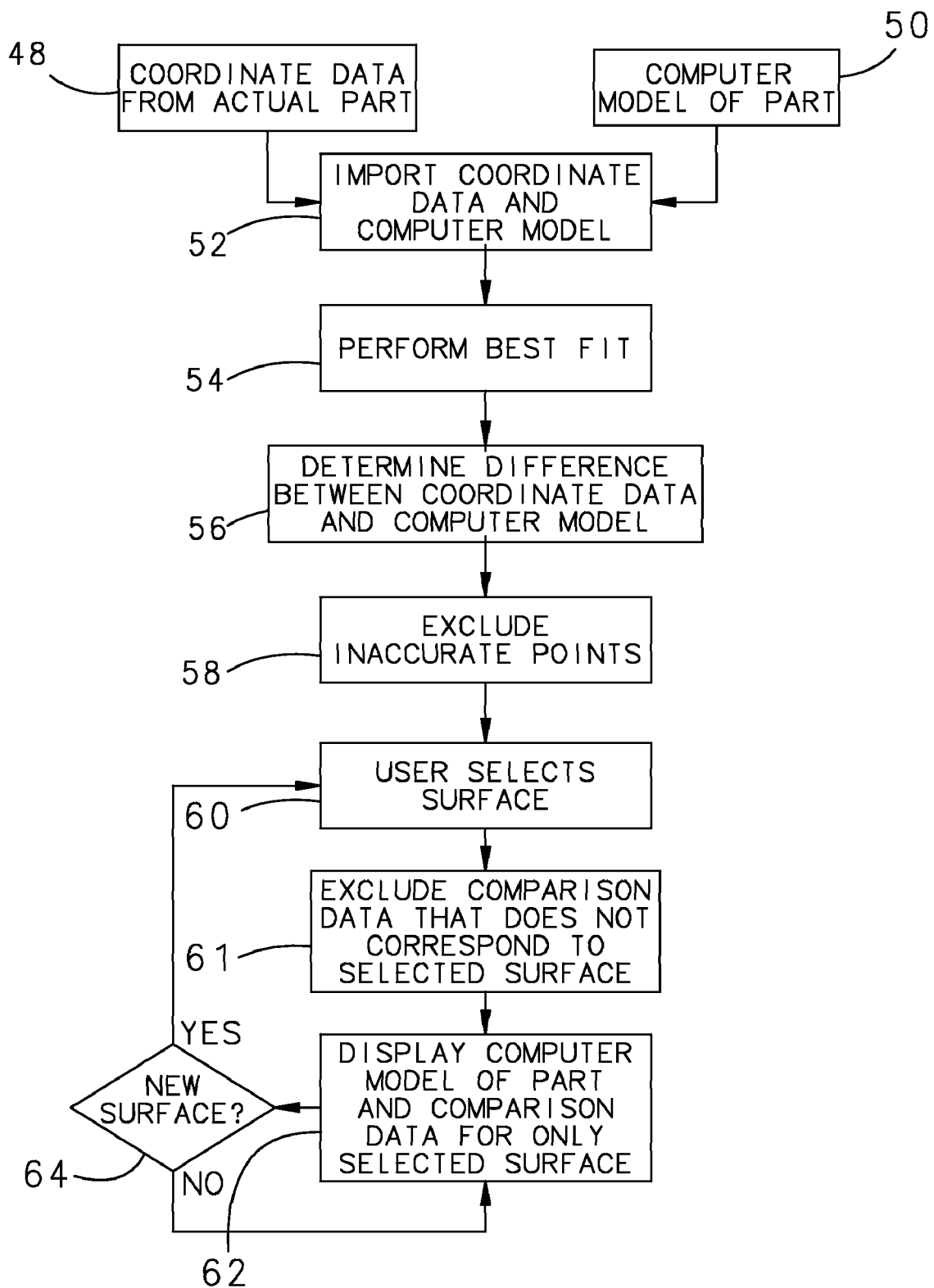
FIG. 2 is a flow chart illustrating an example surface review method.

As shown in FIG. 1, an example scanner 40 scans an example part 42 using a laser 44 to obtain coordinate data for a plurality of points on the part 42. It is understood that the laser 44 may move to contact various regions of the part 42. In some cases a part must be prepared prior to scanning. Part preparation may include a process such as applying a coating to the part, removing a coating from the part, or applying stickers to the part.

The scanner 40 stores the scanned coordinate data in memory. In the example of FIG. 1, the coordinate data is stored on a computer 46, however it is understood that the scanner 40 would be able to store the coordinate data somewhere else, such as within its own internal memory. Also, it is understood that this invention is not limited to use with a scanner 40 that uses a laser 44 to obtain coordinate data. An example display 47 is connected to the computer 46. The display 47 may be used to view a computer model of the part 42, and to view coordinate data from the scanner 40.

FIG. 2 is a flow chart illustrating an example surface review method that compares coordinate data 48 of a part to a computer model 50 of the part. In one example the computer model 50 of the part is a computer-aided design ("CAD") model. The coordinate data 48 and computer model 50 are imported in a first step 52. In a second step 54, a best fit is performed between the coordinate data 48 and the computer model 50. This involves determining an orientation of the scanned part 42 and determining how points of the computer model 50 correspond to points from the coordinate data 48 so that the coordinate data and computer model can be correlated or aligned. In one example a best fit is performed manually. In another example a best fit is performed mathematically by software.

In a third step 56, the coordinate data and the computer model are compared to obtain comparison data. The comparison data includes how much each of the plurality of points in the coordinate data differs from a corresponding point on the computer model. This difference for each point is then stored in memory.

In the scanning process it is possible that some erroneous points may be recorded. If a difference between a point and the computer model exceeds an error threshold, then it is possible that the point was not accurately scanned. In an example fourth step 58, such erroneous points are identified and excluded from further processing.

The coordinate data 48 may be broken into a plurality of groups, or point clouds, where each point cloud corresponds to a selected surface of a part. In a fifth step 60 a user selects a surface of the computer model 50 that the user wishes to review. In a sixth step 61 comparison data that does not correspond to the selected surface is excluded, and in a seventh step 62 comparison data for the selected surface is reported. Reporting comparison data therefore includes displaying the selected surface of the computer model, displaying a point cloud of comparison data associated with that selected surface, and excluding comparison data that does not correspond to the selected surface. In an eighth step 64 a user is able to select a new surface for display.

In one example, a designer operating CAD software and the CAD software itself determine what constitutes a surface within a computer model. A CAD model would have a defined number of surfaces, and each surface may have an identification number. In reviewing comparison data for a part as outlined in steps 60, 61, 62, and 64, a user may choose to simply start with a first surface of the part and sequentially view performance data for each individual surface of the part until the final surface has been viewed. A user may also choose to view comparison data for a surface by entering an identification number of a desired surface or by clicking on the desired surface with a mouse.

The comparison data may be used in a quality control process. For example, if a sufficient quantity of the coordinate data is within an inspection threshold, then the part may be considered to have passed an inspection. However, if a sufficient quantity of coordinate data is outside of the inspection threshold, then the part may be considered to be a faulty part.

Figure 3:
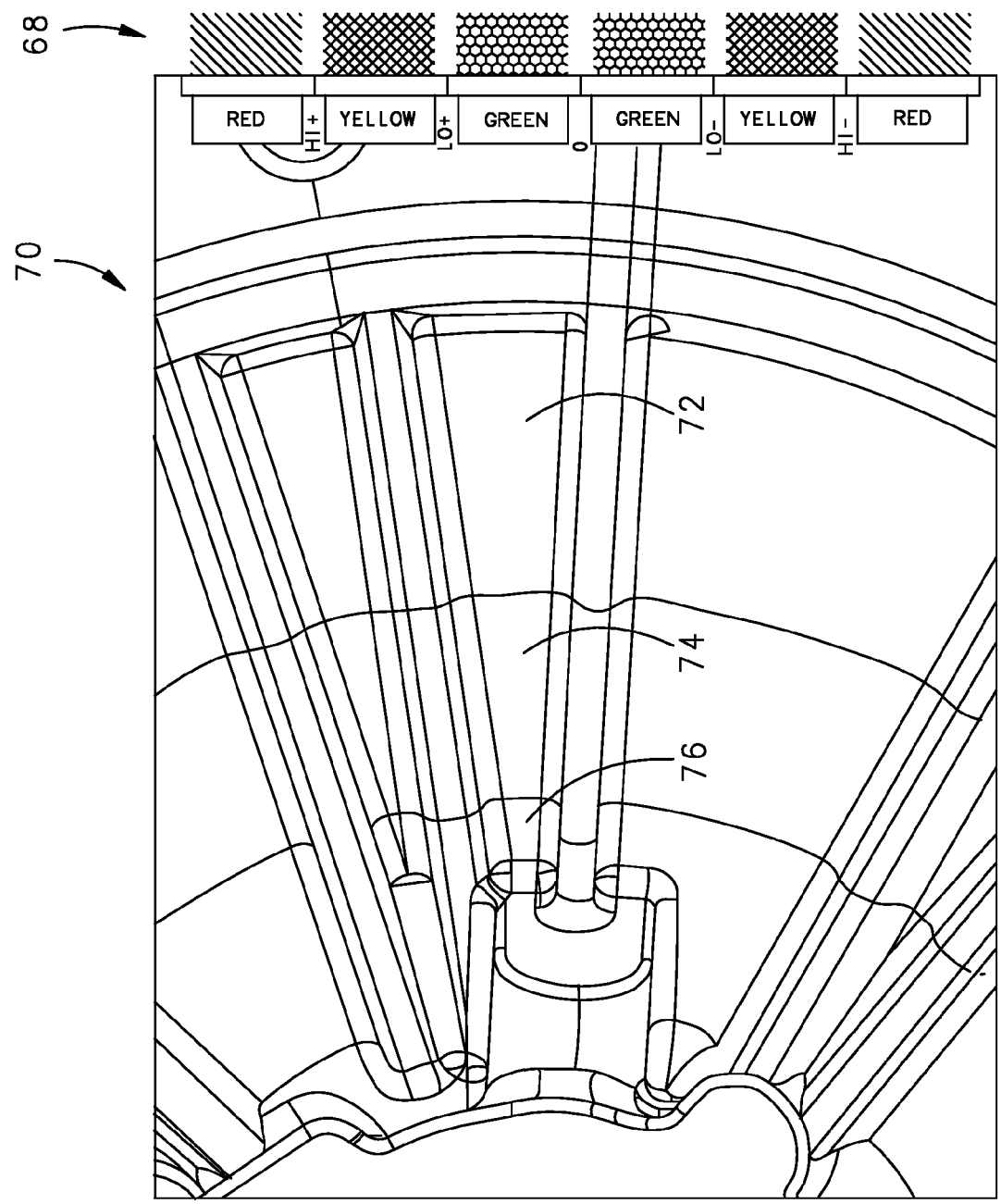
FIG. 3 schematically illustrates an example display of a first surface, a second surface, and a third surface an example part.

In one example, color may be used to show a level of difference between a point in the coordinate data 48 and an associated point in the computer model 50 as determined in step 56. A color scale may be used to indicate a magnitude of difference between a point from the coordinate data 48 and the computer model 50. FIG. 3 schematically illustrates an example color scale 68 indicating a magnitude of difference between a computer model of an example part 70 and an actual part. Green, illustrated by parallel lines, indicates an area of little or no difference between points in the coordinate data and points on an associated computer model of the part 70. Yellow, illustrated by crosshatching, indicates points from the coordinate data that are moderately raised above or moderately recessed in comparison to their corresponding points on the part 70. Red, illustrated by hexagonal shapes, indicates points from the coordinate data that are even more raised or recessed than the yellow points. In an example part inspection, if there was too many red or yellow points, a part may be considered to have failed inspection. While the example color scale 68 of FIG. 3 only includes three colors and uses the same colors for raised and recessed points, it is understood that more or less colors could be used, and that different colors could be used for raised and recessed points to illustrate a level of difference between a point in the coordinate data and an associated point in the computer model.

Figure 4:
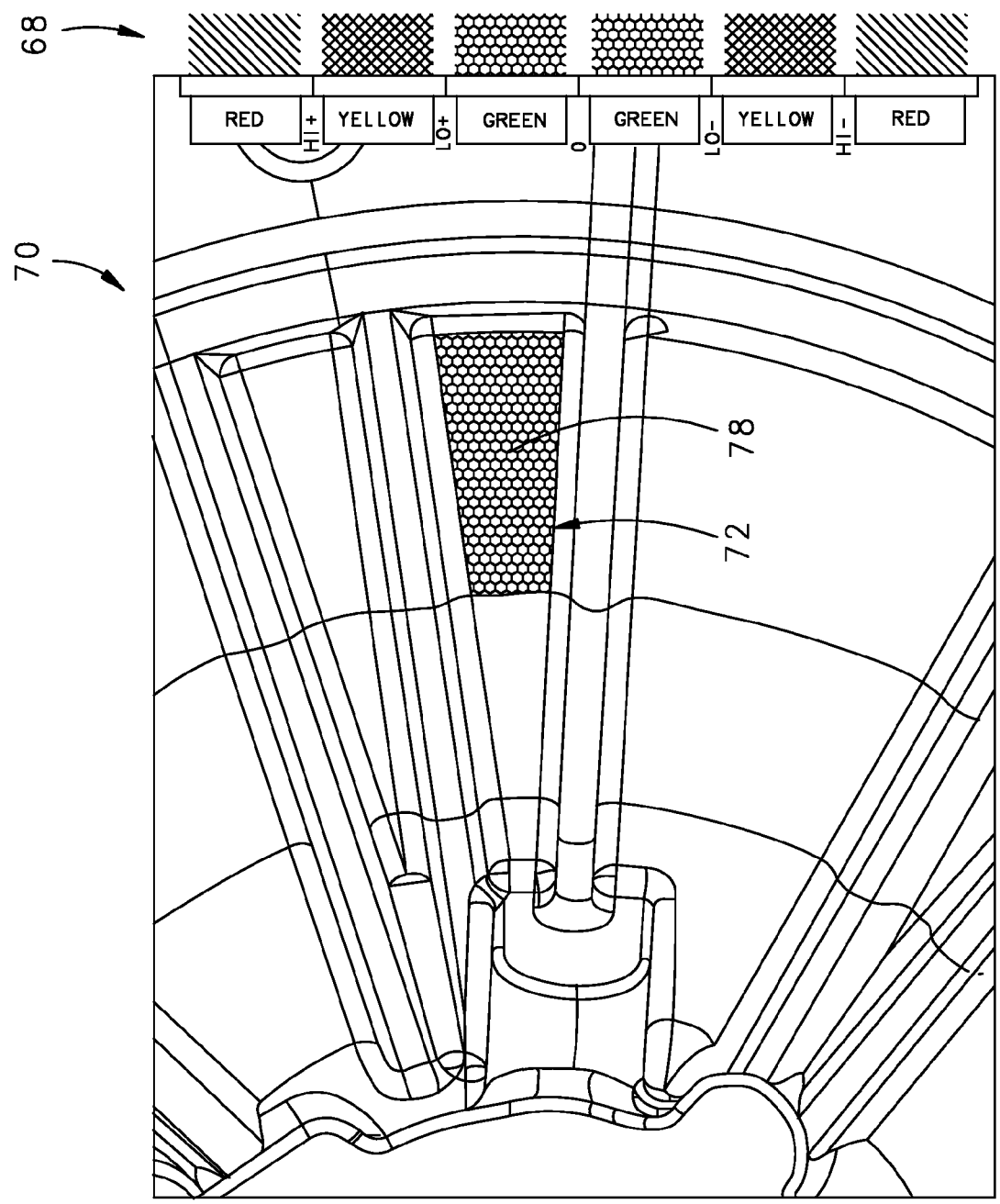
FIG. 4 schematically illustrates an example display of the first surface of FIG. 3.

FIG. 3 schematically illustrates the example part 70 having a first surface 72, a second surface 74, and a third surface 76. FIG. 4 schematically illustrates comparison data for the first surface 72 of the part 70. The surface 72 has a green area 78, shown by a series of hexagons. The green area 78 indicates little or no difference between points in coordinate data and points on an associated computer model of the part 72. Comparison data that does not correspond to the selected surface 72 is excluded, thus portions of the part 70 that are not included in the selected surface 72 are displayed in wireframe. However, it is understood that portions of a part not included in a selected surface do not have to be displayed in wireframe, and could be displayed in another way, such as being shown in a shade of gray.

Figure 5:
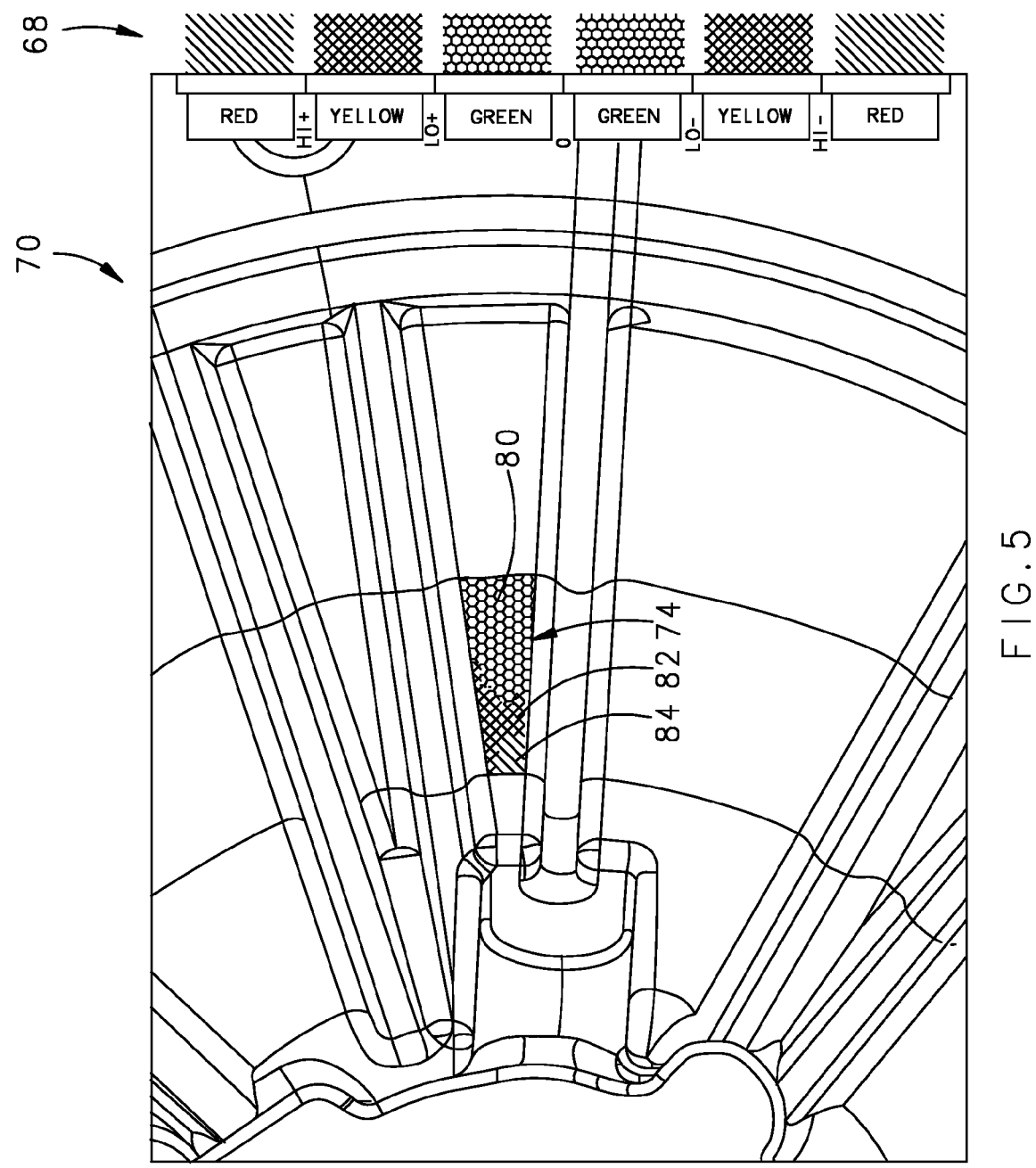
FIG. 5 schematically illustrates an example display of the second surface of FIG. 3.

FIG. 5 schematically illustrates comparison data for the second surface 74 of the example part 70. The surface 74 has a green area 80, indicating little to no difference between the points and an associated computer model of the part 70. The surface 74 also has a yellow area 82, indicating coordinate data that is raised above or recessed with respect to corresponding points in the computer model. The surface 74 also has a red area 84, indicating coordinate data that is raised ever more above or recessed even more below corresponding points in the computer model.

Figure 6:
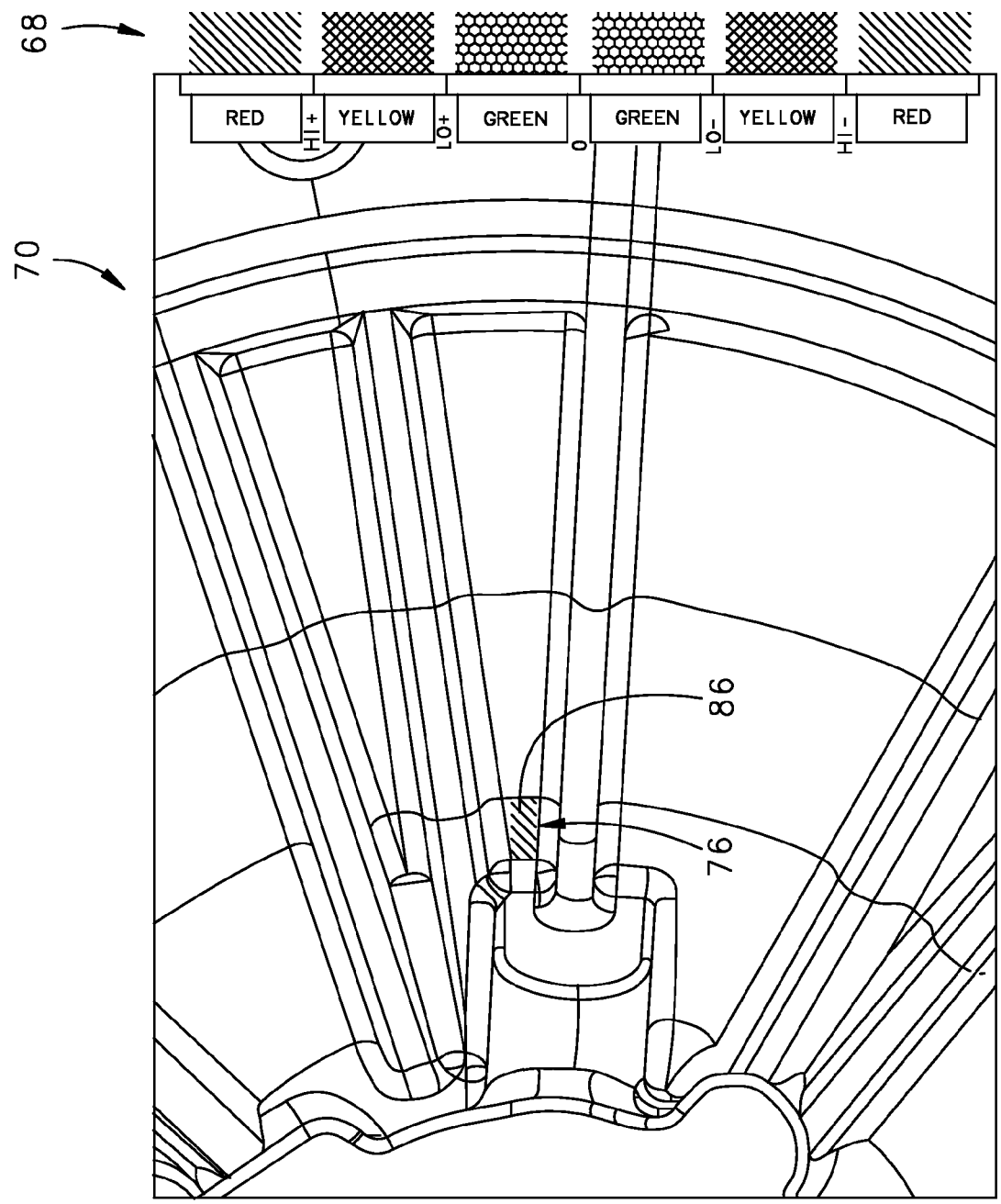
FIG. 6 schematically illustrates an example display of the third surface of FIG. 3.

FIG. 6 schematically illustrates comparison data for the third surface 76 of the example part 70. The surface 76 has a red area 86, indicating points that are highly raised above or highly recessed below corresponding points in the computer model. Unlike the prior art, where comparison data for many surfaces is displayed simultaneously, the examples of FIGS. 4-6 only display comparison data for a single selected surface and exclude comparison data that does not correspond to the selected surface.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of comparing a part to a computer model of the part, comprising:
   1) obtaining coordinate data for a plurality of points on a part;
   2) comparing on a computer the coordinate data to a computer model of the part to obtain comparison data;
   3) reporting comparison data corresponding to a selected surface of the part;
   4) excluding comparison data for all surfaces other than the selected surface;
   5) identifying inaccurate points in the coordinate data; and
   6) excluding the inaccurate points from the reported comparison data.

2. The method of claim 1, wherein steps 5-6 occur before step 3.

3. The method of claim 1, wherein step 4 includes displaying a portion of the part not included in the selected surface as wireframe.

4. The method of claim 1, wherein step 3 includes:
   displaying an image of the selected surface of the computer model; and
   displaying a plurality of points from the coordinate data that correspond to the selected surface, wherein each point is displayed to show a corresponding level of difference between the point and the computer model.

5. The method of claim 4, wherein each point is displayed in a color corresponding to a level of difference between the point and the computer model.

6. The method of claim 1, wherein step 1 includes:
   preparing a part for scanning;
   scanning a plurality of points of the part with a scanner to obtain coordinate data associated with the plurality of points; and
   storing the coordinate data in memory.

7. The method of claim 1, wherein step 4 includes displaying a portion of the part not included in the selected surface in gray.

8. The method of claim 1, wherein the selected surface is one of a single planar portion or a single continuous curved portion of the part in the computer model.

9. The method of claim 1, wherein the selected surface is less than an entire area of the part and wherein the selected surface extends between other surfaces transverse to the selected surface.

10. A system for comparing a part to a computer model of the part, comprising:
    a scanner to scan a part and obtain coordinate data for a plurality of points on the part;

software that compares the coordinate data to a computer model of the part to determine how much each of the plurality of points differs from a corresponding point on the computer model; and a display that illustrates a selected surface of the computer model and a plurality of points from the coordinate data that correspond to the selected surface, and excludes all points from the coordinate data that do not correspond to the selected surface.

11. The system of claim 10, wherein the display illustrates the coordinate data corresponding to the selected surface by illustrating each point of the coordinate data in a manner corresponding to a level of difference between the point and the computer model.

12. The system of claim 11, wherein each point is displayed in a color corresponding to a level of difference between the point and the computer model.

13. The system of claim 10, wherein the software compares the coordinate data to the computer model by establishing a best fit between the coordinate data and the computer model, determining how much each of the plurality of points in the data differs from a corresponding point on the computer model, and storing the difference of each point in memory.

14. The system of claim 10, wherein the software identifies inaccurate points in the coordinate data and excludes the inaccurate points from the display.

15. The system of claim 10, wherein the display illustrates a portion of the part whose coordinate data has been excluded in gray.

16. The system of claim 10, wherein the display illustrates a portion of the part whose coordinate data has been excluded as wireframe.

17. The system of claim 10, wherein the selected surface is one of a single planar portion or a single continuous curved portion of the part in the computer model.

18. A method of comparing a part to a computer model of the part, comprising:

obtaining coordinate data for a plurality of points on a part;

establishing on a computer a best fit between the coordinate data and the computer model;

determining how much each of the plurality of points in the data differs from a corresponding point on the computer model;

storing the difference of each point in memory as comparison data;

reporting comparison data corresponding to a selected surface of the part; and excluding comparison data for all surfaces other than the selected surface.

19. A system for comparing a structure to a computer model of the structure, comprising:

a scanner to scan a structure and obtain scanned coordinate data for a plurality of points on the structure;

a computer model of the structure, the computer model defining a plurality of distinct surfaces, each surface being less than an entire area of the part and each surface being one of a single planar portion or a single continuous curved portion of the structure in the computer model; and software that compares the scanned coordinate data to the computer model of the structure to determine how much each of the plurality of points differs from a corresponding point on the computer model; and a display that illustrates a selected surface of the computer model and a portion of the plurality of points from the coordinate data that correspond to the selected surface, and excludes all points from the coordinate data that do not correspond to the selected surface.

* * * * *